US 9,237,505 B2

(12) United States Patent
Munari et al.

(10) Patent No.: US 9,237,505 B2
(45) Date of Patent: Jan. 12, 2016

(54) METHOD FOR ROUTING DATA IN A WIRELESS SENSOR NETWORK

(71) Applicant: GLOBALFOUNDRIES INC., Grand Cayman (KY)

(72) Inventors: Andrea Munari, Zurich (CH); Wolfgang Hans Schott, Zurich (CH)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 14/364,330

(22) PCT Filed: Nov. 20, 2012

(86) PCT No.: PCT/IB2012/056566
§ 371 (c)(1),
(2) Date: Jun. 11, 2014

(87) PCT Pub. No.: WO2013/093670
PCT Pub. Date: Jun. 27, 2013

(65) Prior Publication Data
US 2014/0328240 A1 Nov. 6, 2014

(30) Foreign Application Priority Data
Dec. 22, 2011 (EP) .................................. 11195182

(51) Int. Cl.
*H04Q 7/00* (2006.01)
*H04W 40/00* (2009.01)
(Continued)

(52) U.S. Cl.
CPC ............ *H04W 40/005* (2013.01); *H04W 4/005* (2013.01); *H04W 40/20* (2013.01); *H04W52/0216* (2013.01); *H04W 52/0219* (2013.01); *H04W 4/02* (2013.01); *H04W 4/023* (2013.01); *H04W 76/048* (2013.01); *H04W 84/18* (2013.01)

(58) Field of Classification Search
None
See application file for complete search history.

(56) References Cited

U.S. PATENT DOCUMENTS 6,513,006 B2   1/2003   Howard
7,277,414 B2 * 10/2007  Younis .................. G01D 9/005
                                              370/311

(Continued)

FOREIGN PATENT DOCUMENTS

CN   101577668 A   11/2009
CN   101715243 A   5/2010
CN   101867919 A   12/2010

OTHER PUBLICATIONS

Xu, Ya et al., "Geography-informed Energy Conservation for Ad Hoc Routing", In Proc. of the ACM/IEEE Intl Conf on Mob Comp and Networking, Jul. 2001, pp. 70-84. Rome, Italy.
(Continued)

*Primary Examiner* — Duc C Ho

(74) *Attorney, Agent, or Firm* — Thompson Hine LLP

(57) ABSTRACT

The present invention relates to a method for routing at least a data packet in a wireless sensor network (10), the wireless sensor network (10) comprising: at least a source node (S) that is configurable to transmit at least a data packet; at least a destination node (D) that is configurable to receive the data packet transmitted by the source node (S), and interconnectable network nodes ($s_i$) between the source node (S) and the destination node (D) that are configurable to receive and forward the data packet, the method comprising the steps of: operating the network nodes ($s_i$) according to a sleep-active schedule comprising at least a sleep mode and an active mode, and configuring the network nodes ($s_i$) to have information on their own geographic location and the geographic location of the destination node (D), the method further comprising the steps of: dividing the wireless sensor network (10) into a plurality of disjoint areas ($A_0, A_{M-1}, A_1, A_2$) that are separated by boundaries; separating each area ($A_0, A_{M-1}, A_1, A_2$) into at en least two regions, the regions being an inner boundary region (I), a central region (C) and an outer boundary region (O); selecting forwarding nodes out of the network nodes ($s_i$) to route the data packet from the source node (S) to the destination node (D), such forwarding nodes being selected on the basis of their geographic location relative to the destination node (D) and the network nodes being synchronized relative to each other, and configuring the sleep-active schedule such that only those forwarding nodes that are selected to route the data packet in a given time window are operable in the active mode and all the other network nodes ($s_i$) are operable in the sleep mode.

20 Claims, 9 Drawing Sheets o Central region node
● Inner boundary node
◉ Outer boundary node

(51) Int. Cl.

*H04W 40/20* (2009.01)
*H04W 52/02* (2009.01)
*H04W 4/00* (2009.01)
*H04W 84/18* (2009.01)
*H04W 76/04* (2009.01)
*H04W 4/02* (2009.01)

(56) References Cited

U.S. PATENT DOCUMENTS

| | | | |
|---|---|---|---|
| 7,979,096 B1 * | 7/2011 | Elliott | H04W 72/1278 340/539.22 |
| 8,204,992 B2 | 6/2012 | Arora | |
| 8,307,082 B2 | 11/2012 | Majanen | |
| 2007/0233835 A1 * | 10/2007 | Kushalnagar | H04L 12/12 709/223 |
| 2010/0074175 A1 * | 3/2010 | Banks | H04L 1/1867 370/328 |
| 2012/0219826 A1 * | 8/2012 | Li | C07C 43/1786 428/800 |

OTHER PUBLICATIONS

Xu, Ya et al., "Topology Control Protocols to Conserve Energy in Wireless Ad Hoc Networks", Tech Report 6, Univ of Cal, LA, Center for Embedded Networked Computing, Jan. 2003.

\* cited by examiner

METHOD FOR ROUTING DATA IN A WIRELESS SENSOR NETWORK

CROSS-REFERENCE TO RELATED APPLICATIONS

This application claims priority under 35 U.S.C. §371 from PCT Application, PCT/IB2012/056566, filed on Nov. 20, 2012, which claims priority from the European Patent Application No. 11195182.8, filed on Dec. 22, 2011. The entire contents of both applications are incorporated herein by reference.

FIELD OF THE INVENTION

The present invention relates to a method for routing data in a wireless sensor network.

BACKGROUND OF THE INVENTION

Wireless sensor networks have the potential for diverse application for example, in building surveillance, disaster prevention and environmental monitoring. A wireless sensor network is made up of a relatively large number of nodes, generally referred to as network nodes, that are located in and spread over a geographic area corresponding to that in which the wireless sensor network is implemented. The network nodes may typically be inexpensive, battery-powered, electronic devices, such as sensors, for example, with reduced capability to store, process and/or analyse data. The network nodes are generally applied to fulfill at least two challenging tasks: firstly, to continuously monitor the status of a physical phenomena or environmental condition(s), and secondly, transmitting the collected data to a remote central server for the processing and/or analysis of the data. In order to facilitate the latter task, each of the network nodes may be equipped with a relatively low-power radio transceiver with reduced range coverage. Cooperation between the radio transceivers corresponding with the network nodes is used to form a wireless ad hoc network for routing data sensed by one of the network nodes, generally referred to as the source node, to the remote central server, generally referred to as a destination node, through selected network nodes between the source node and the destination node via multi-hop transmission, such selected network nodes being hereinafter referred to as forwarding nodes.

A problem of wireless sensor networks, particularly when the network nodes are implemented by way of electronic devices powered by battery, is that loss of battery in one or more of the network nodes may cause data loss and, in the worst case, a complete failure, in the operation of the wireless sensor network.

In order to address the issue of battery conservation in the network nodes, it has been previously-proposed to cyclically operate a wireless sensor network in one of two modes of operation: a sleep mode and an active mode. In the sleep mode of operation, the radio transceivers of the network nodes are switched off and so, in this mode of operation, the network nodes do not contribute in the forwarding of data. In the active mode of operation, neighbouring network nodes, and specifically radio transceivers corresponding thereto, communicate with each other and are involved in the forwarding of data in the direction of and, ultimately, to the destination node. In order to facilitate such communication, in the active mode, those network nodes that are involved in forwarding the data towards the destination node are synchronised such that the scheduling of data receipt and/or transmission between them is conducted in such a way that a scenario of data loss is reduced or altogether avoided. In this regard, IEEE Standard, "Part 15.4: Wireless Medium Access Control (MAC) and Physical Layer (PHY) Specifications for Low-Rate Wireless Personal Area Networks", IEEE, Los Alamos, 2003, describes a synchronisation strategy for use in a wireless network that is implemented by periodically transmitting beacons from a central network coordinator to the network nodes. After beacon reception, the radio transceiver of a synchronised network node listens to the radio channel established between the radio transceivers of the network nodes for a time-period of such a duration that data packets may be received from neighbouring network nodes and, if needed, transmitted onwards towards the destination node. After completion of these tasks, and until the next beacon is received, the aforementioned synchronised network node is operated in the sleep mode, with its associated radio transceiver being powered off. The performance gain obtained with this power management strategy is governed by the duty cycle of the network node, which is defined as the ratio of the length of the active period to one beacon interval. Other similar strategies have been described in J. H. Kim et. al., "Power saving method for wireless sensor network", U.S. Pat. No. 7,447,256, November 2008, and C. J. Yoon, "Energy-efficient medium access control protocol and system for sensor networks", US Patent Application 2006/0128349, June 2006.

In previously-proposed wireless sensor networks, static routing protocols have been used to propagate data packets from the source node to the destination node. Examples of such static routing protocols have been described by C. Perkins and E. Royer, in the document titled, "Ad-hoc on demand distance vector (AodV) routing" published in IEEE WMSCA, New Orleans, La., US, February 1999 and by D. Johnson, D. Maltz and J. Broch, in the document titled, "DSR: The dynamic source routing protocol for multi-hop wireless and ad-hoc networks", published in Ad-Hoc Networking, Addison Wesley, 2001. Such static routing protocols rely on the establishment of a single path from the source node to the destination node before the transmission of data by the source node to those network nodes determined in accordance with the static routing protocol for forwarding data to the destination node. Due to the execution of route discovery and route maintenance procedures being done before transmission of the data from the source node, some drawbacks associated with static routing protocols include an increased protocol overhead and performance degradation in terms of energy consumption. Furthermore, since the protocol overhead generally exponentially increases with the number of network nodes, static routing protocols may not provide an energy-efficient solution for relatively large-scale wireless sensor networks.

For large-scale wireless sensor networks, it has been proposed to use a geographic routing protocol. An example of a geographic routing protocol has been provided by M. Zorzi and R. R. Rao in the document titled, "Geographic random forwarding (GeRaF) for ad-hoc sensor networks: multi-hop performance", published in IEEE Transactions on Mobile Computing, pp. 337-348, 2003. Geographic routing is based on the principle that a route for forwarding data from the source node to the destination node is dynamically constructed whilst data is being transmitted from the source node in the direction of, and to, the destination node via forwarding nodes. The aforementioned dynamic construction of the route is performed on the basis of information on the geographic location information of the involved forwarding nodes. In geographic routing, a node that has a data packet to transmit broadcasts a request message containing information on the geographical coordinates of the destination node. Network nodes within the radio coverage range of the broadcasting node each receive the request message, such network nodes being generally referred to as neighbouring network nodes. They then exploit their topological knowledge to calculate the advancement that they can offer towards the destination node and contend amongst each other to elect the next network node that is closest to the destination node. Since information is only locally exchanged between a node that has data to transmit and neighbouring network nodes, geographic routing scales with the size of the wireless sensor network in which it is implemented, thereby making it advantageous for use in large-scale wireless sensor networks compared to previously-proposed routing protocols, such as, for example, static routing protocols. A prerequisite for the application of geographic routing is that all network nodes know their own geographic location within the network. This geographic information may be: set manually at initial deployment of the network nodes; or be provided using a location positioning system such as a global positioning system (GPS) in an outdoor environment, or by using the positioning system proposed by S. Furrer, W. Schott and B. Weiss in U.S. Pat. No. 7,761,233, July 2010, for example.

Whilst geographic routing protocols alleviate some of the drawbacks associated with previously-proposed techniques/protocols, it is still a challenge to route data in a wireless sensor network, particularly one that is large-scaled, with improved reliability and network performance whilst also addressing energy consumption issues.

SUMMARY OF THE INVENTION

According to an embodiment of a first aspect of the present invention, there is provided a method for routing at least a data packet in a wireless sensor network, the wireless sensor network comprising: at least a source node that is configurable to transmit at least a data packet; at least a destination node that is configurable to receive the data packet transmitted by the source node, and interconnectable network nodes between the source node and the destination node that are configurable to receive and forward the data packet, the method comprising the steps of: operating the network nodes according to a sleep-active schedule comprising at least a sleep mode and an active mode, and configuring the network nodes to have information on their own geographic location and the geographic location of the destination node, the method further comprising the steps of: dividing the wireless sensor network into a plurality of disjoint areas that are separated by boundaries; separating each area into at least two regions, the regions being an inner boundary region, a central region and an outer boundary region; selecting forwarding nodes out of the network nodes to route the data packet from the source node to the destination node, such forwarding nodes being selected on the basis of their geographic location relative to the destination node and the network nodes being synchronised relative to each other, and configuring the sleep-active schedule such that only those forwarding nodes that are selected to route the data packet in a given time window are operable in the active mode and all the other network nodes are operable in the sleep mode. An embodiment of the present invention exploits a combination of geographic routing and sleep-mode support to transmit data from the source node to the destination node. In this regard, the network nodes in an embodiment of the present invention are synchronised to a common reference time and are operated in accordance with a sleep-active schedule such that only those forwarding nodes that have been selected to be directly involved in geographic routing at any given time are operated in the active mode whereas all the other network nodes are operated in the sleep-mode. This feature increases the lifetime of the batteries powering the network nodes and so extends the advantages of increased energy efficiency, improved network performance and reliability to an embodiment of the present invention. Furthermore, and in contrast to, for example, static routing protocols, selection of the forwarding nodes in an embodiment of the present invention is done once data has been transmitted from the source node generally towards the destination node. This feature extends the advantages of reduced protocol overhead and improved network performance due to reduced energy consumption to an embodiment of the present invention.

Preferably, configuration of the sleep-active schedule is done such that, for a given pair of adjacent areas that are separated by a boundary where the outer boundary region of one area out of the given pair of areas and the inner boundary region of the other area out of the given pair of areas abut the boundary that separates the given pair of adjacent areas, there is an overlap between the respective active modes of at least those forwarding nodes in the outer boundary region of the one area out of the given pair of adjacent areas and the inner boundary region of the other area out of the given pair of adjacent areas. In this way, reduced energy consumption and improved performance may be facilitated since all the network nodes except for the forwarding nodes in the aforementioned regions may be deactivated and/or maintained in the sleep mode.

Desirably, configuration of the sleep-active schedule is done such that there is an overlap between the respective active modes of forwarding nodes corresponding to the regions in a given area. By way of this feature, a further improvement in network performance is facilitated since data loss during the handover of the data packet from region to region in the given area is reduced and further energy savings may be made since the network nodes in remote areas and/or those network nodes that may not potentially belong to the next set of forwarding nodes may be deactivated or kept dormant in the sleep-mode.

Preferably, the active mode is configured so as to comprise at least: an incoming data phase corresponding to when the data packet is received at the outer boundary region of a given area, forwarding data phase corresponding to when the data packet traverses through the given area and an outgoing data phase corresponding to when the data packet is transmitted from the inner boundary region of the given area to another adjacent-lying area. The duration of each of the distinct phases of the active mode may be set to correspond to data routing in a given area. So, for example, a duration of the incoming data phase may be set to correspond to the time for data traffic to be received by the given area from an adjacent area; a duration of the forwarding data phase may be set to correspond to the time taken for the data to traverse through the regions of the given area in order to reach a boundary of the given area with a next adjacent-lying area and a duration of the outgoing data phase may be set to the time taken to transmit the data to the next adjacent-lying area. An advantage associated with this feature is data loss during routing may be reduced and so network performance may be further improved.

Desirably, configuration of the sleep-active schedule is done such that there is an overlap between the outgoing data phase of the forwarding nodes in the inner boundary region of one out of a given pair of adjacent areas that are separated by a boundary and the incoming data phase of the forwarding nodes in the outer boundary region of the other out of the given pair of adjacent areas. With this feature, loss of data during routing between a given pair of areas that are separated by a boundary is reduced. Furthermore, apart from the forwarding nodes partaking in data transmission between the given pair of areas, all the other network nodes may be operated in sleep-mode. In this way, energy consumption may be reduced and network reliability may be further increased.

Preferably, if the data packet is received before the end of a forwarding phase in one of a given pair of adjacent areas and an active period of the other out of the given pair of adjacent areas has not commenced, forwarding of the data packet from the one area to the other area is deferred until such an active period commences. This feature extends the advantage of reduced data loss when data is transmitted between adjacent areas, thereby improving network performance and reliability.

Preferably, configuration of the sleep-active schedule is done such that there is an overlap between at least the respective forwarding phases of the forwarding nodes in the regions of an area. With this feature, data routing within the regions of a given area is improved. Furthermore, all of the forwarding nodes corresponding to the different regions in a given area need not be activated during the active mode of operation. In this regard, only the forwarding nodes in the outer boundary region of the given area may be activated during the incoming data phase of the active period as it is likely that only they would be involved in receiving data from an adjacent area. Also, only the forwarding nodes in the inner boundary region of the given area may be activated during the outgoing data phase of the active period as only they would be involved in data handover at the boundary with another adjacent-lying area. During the forwarding phase of the active period, all the forwarding nodes corresponding to the different regions of the area are activated since the data traverses through the area. This feature of an embodiment of the present invention offers the advantages of further reduced energy consumption and improved network reliability and performance.

Desirably, in the step of arranging the areas, the areas are arranged so as to comprise an inner area comprising the destination node, one or more outer areas surrounding the inner area, and the outermost area of the outer areas comprising the source node. In this regard, the outermost area comprising the source node is preferably separated so as to comprise at least a central region and an inner boundary region and/or the inner area comprising the destination node is desirably separated so as to comprise at least an outer boundary region and a central region. An advantage associated with these features is that an embodiment of the present invention may be implemented with reduced complexity. Furthermore, and preferably, in the step of separating the areas, a given outer area is separated so as to comprise an inner boundary region, central region and outer boundary region.

Desirably, in the step of separating each area, the network nodes corresponding to the outer boundary region, central region and the inner boundary region are respectively allocated to be outer boundary nodes, central region nodes and inner boundary nodes. In an embodiment of the present invention, the network nodes are configured so as to have information on their own geographic location and that of the destination node. The network nodes are further configured to autonomously identify a region in a given area to which they belong to and their specific role in that region. This feature extends the advantage of improved network performance to an embodiment of the present invention.

Preferably, in the step of configuring the network nodes to have information on their own geographic location, a global positioning system is used. Where GPS is used to provide location information of the network nodes, it can also be used as a reference source for improving the accuracy with which network nodes in the wireless sensor network may be synchronised. Thus, this feature extends the advantage of improved network performance to an embodiment of the present invention.

According to an embodiment of a second aspect of the present invention, there is provided a wireless sensor network comprising: at least a source node that is configurable to transmit at least a data packet; at least a destination node that is configurable to receive the data packet transmitted by the source node, and interconnectable network nodes between the source node and the destination node that are configurable to receive and forward the data packet, the network nodes being operable according to a sleep-active schedule comprising at least a sleep mode and an active mode and being configurable to have information on their own geographic location and the geographic location of the destination node, the wireless sensor network further comprising: a plurality of disjoint areas that are separated by boundaries; at least two regions in a given area, the regions being an inner boundary region, a central region and an outer boundary region, and forwarding nodes comprising a subset of the network nodes, which are selected on the basis of their geographic location relative to the destination node and the network nodes being synchronised relative to each other, to route the data packet from the source node to the destination node, whereby only those forwarding nodes that are selected to route the data packet in a given time window are operable in the active mode and all the other network nodes are operable in the sleep mode.

According to an embodiment of a third aspect of the present invention, there is provided a computer program comprising instructions for carrying out the steps of an embodiment according to the first aspect of the present invention when the computer program is executed on a computer system.

Features of one aspect of the invention may be applied to any other aspect and vice versa. Any disclosed embodiment may be combined with one or several of the other embodiments shown and/or described. This is also possible for one or more features of the embodiments.

BRIEF DESCRIPTION OF THE DRAWINGS

Reference will now be made, by way of example, to the accompanying drawings, in which.

DETAILED DESCRIPTION OF THE PREFERRED EMBODIMENTS OF THE PRESENT INVENTION

Figure 1:
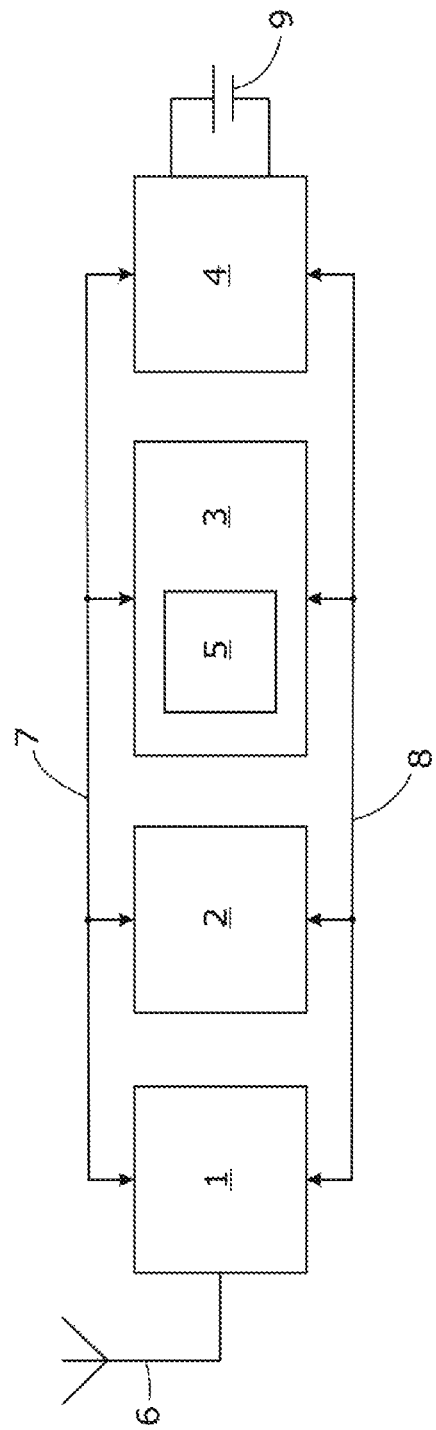
FIG. 1 is a block diagram of a network node in an embodiment of the present invention.

Within the description, the same reference numerals or signs have been used to denote the same parts or the like.

Reference is now made to FIG. 1, which schematically illustrates a composition of a network node in an embodiment of the present invention. Each network node is a sensor comprising a transceiver 1, a processor 2, a memory 3 and a power supply 4, all of which are interconnected by a bus architecture 7. An antenna 6 is connectable to the transceiver 1. A program code 5 is stored in the memory 3. The power supply 4 receives electrical power from a battery 9. In operation, the power supply 4 supplies electrical power from the battery 9 to the transceiver 1, processor 2 and memory 3 via power supply lines 8. The antenna 6 detects radio frequency signals from neighbouring network nodes and thereby facilitates receipt of data packets by the transceiver 1 from the neighbouring network nodes. Similarly, the antenna 6 facilitates transmission of data packets from the transceiver 1 to other neighbouring network nodes. The program 5 stored in the memory 3 comprises program instructions that are executable by the processor 2. The processor 2 controls operation of the transceiver 1 and the power supply 4 via the bus architecture 7 based on the program code 5 stored in the memory 3. Both the transmission and receipt of data packets by the transceiver 1 are controllable by the processor 2 based on the program code 5. The data may be temporarily stored in the memory 3.

Additionally, the power supply 4 selectively supplies electrical power to the transceiver 1 to activate and deactivate the network node under the control of the processor 2 based on the program code 5. This facilitates preservation of the lifetime of the battery 9 during periods of inactivity. The program code 5, when executed by the processor 2, causes the network node to behave in the aforedescribed manner.

Figure 2:
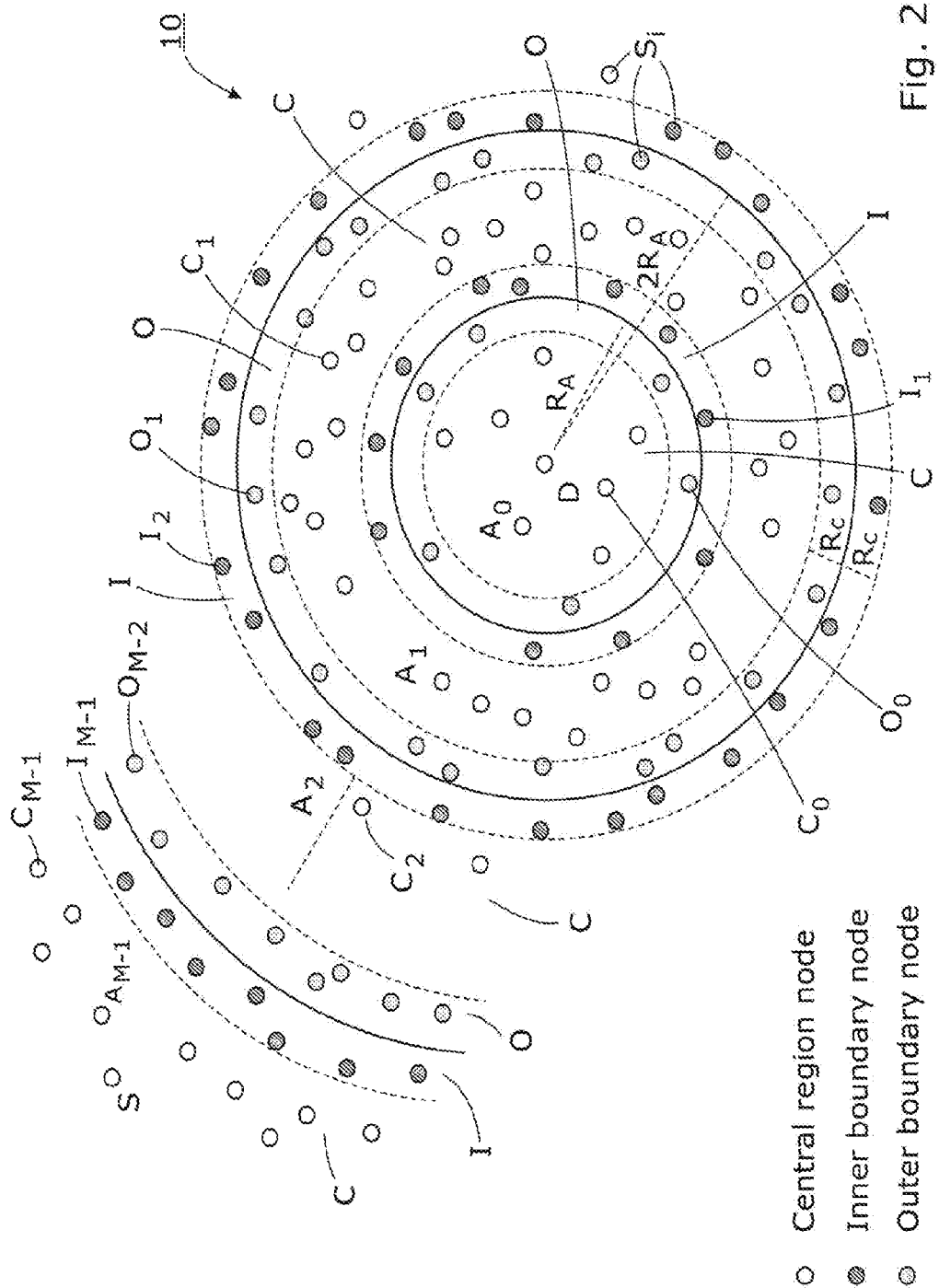
FIG. 2 schematically illustrates an embodiment of the present invention.

FIG. 2 shows a wireless sensor network 10 according to an embodiment of the present invention. The wireless sensor network 10 comprises a set $N=\{s_1, s_2, \ldots s_N\}$ of N network nodes, which are interconnected and spatially distributed over a geographic area over which the wireless sensor network 10 is implemented. Each of the network nodes $s_i$ may have a composition as hereinbefore described with reference to FIG. 1. Out of the network nodes $s_i$, a source node S is configured to sense or monitor a condition locally and to transmit one or more data packets corresponding to the sensed/monitored condition to a destination node D for further processing and/or analysis. Each of the network nodes $s_i$, is configured to have information on its own geographic location and the geographic location of the destination node D. The network nodes $s_i$ are operable in accordance with a sleep-active schedule comprising at least a sleep-mode of operation, in which they are deactivated and so unable to partake in the receipt or transmission of the data packet, and an active mode of operation in which they are activated, thereby being able to receive and forward the data packet.

Due to the power capability of the transceivers 1 associated with the network nodes $s_i$ and the possibility that the source node S and the destination node D are located out of radio communication range, it may not be feasible for the source node S to directly transmit a data packet to the destination node D. Instead, data is routed through the wireless sensor network 10 via multi-hop transmissions. In an embodiment of the present invention, geographic routing is used for routing data from the source node S to the destination node D via forwarding nodes, which are a subset of the network nodes that are selected to route the data on the basis of their geographic location relative to the destination node D.

Regarding geographic routing in an embodiment of the present invention, when the source node S has a data packet to transmit to the destination node D, it transmits a request message with information on its distance to the destination node D. Each of the neighbouring network nodes that receive the request message begins a distributed contention procedure to become a forwarding node by comparing its distance to the destination node D to the information contained in the request message, and by delaying its response to the request message by an interval, the duration of which is inversely proportional to a geographic advancement that the neighbouring network node offers towards the destination node D. In this way, a forwarding node is ascertained, being the network node that offers increased geographic advancement towards the destination node D out of all the neighbouring network nodes that receive the request message transmitted by the source node S. The forwarding node establishes itself in such a role by accessing and sending a response on the radio channel established between the radio transceivers 1 of the network nodes $s_i$ in the wireless sensor network 10 first, whereas all the other contenders refrain from accessing/transmitting a message on the radio channel as they overhear the response of the forwarding node. The data packet is then sent by the source node S to the forwarding node. The above-described procedure is then initiated again in order to identify the next forwarding node and reiterated until the data packet is handed over to the destination node D via multi-hop transmissions through the selected forwarding nodes.

An embodiment of the present invention exploits a combination of geographic routing and sleep-mode support to transmit data from the source node S to the destination node D. In this regard, the network nodes $s_i$ in an embodiment of the present invention are synchronised to a common reference time and are operated in accordance with a sleep-active schedule such that only those forwarding nodes that are directly involved in geographic routing at any given time are operated in the active mode whereas all the other network nodes are operated in sleep-mode.

In order to better appreciate the advantages offered by an embodiment of the present invention, reference is made to the fact that in geographic routing, a forwarding node in current possession of the data packet may only select the next forwarding node to which the data packet is routed from a subset of network nodes $s_i$ that are activated when a request message is sent out by the forwarding node. In a first scenario where selection of the next forwarding node is done randomly using a non-synchronised, sleep-active schedule, for example, it may be that only a few of the network nodes $s_i$ are activated and available to communicate with the forwarding node when it sends out a request message to initiate the routing procedure. Potentially, this scenario may lead to an inappropriate choice of the next forwarding node on account of a network node that is closest to the destination node D and neighbouring the broadcasting node lying dormant in the sleep-mode of operation when the request message is sent out. In an even worst case, this scenario may lead to routing failure on account of all the network nodes $s_i$ within the radio coverage range of the broadcasting node being unavailable to respond to the request message due to, for example, being operated in the sleep-mode. This scenario may contribute to performance degradation in terms of reliability and latency. In a further scenario where selection of the next forwarding node is done using a synchronised, sleep-active schedule, typically all the network nodes $s_i$ are activated at the same time. Such an approach may improve the identification of forwarding nodes to route the data to the destination node D via multi-hop transmissions. However, all the network nodes $s_i$ have to be operated in the active mode regardless of whether they are selected as forwarding nodes to route the data packet to the destination node D, or even if they are not involved in the short term to route data due to being hops away from the location of the current forwarding node by either being closer to the source node S or the destination node D. Thus, some disadvantages associated with this further scenario are: reduced battery lifetime, increased energy consumption, performance degradation and, in the worst case, routing failure. In contrast to the above-described scenarios, in an embodiment of the present invention, only those forwarding nodes that are directly involved in geographic routing at any given time are operated in the active mode whereas all the other network nodes $s_i$ are operated in sleep-mode. In this way, energy savings may be made, whilst conserving the advantages associated with geographic routing in terms of reliability and latency, by facilitating the most favourable choices of forwarding nodes for routing the data.

In an embodiment of the present invention, routing of data from the source node S to the destination D at any given time is done by a specific, a priori selected subset of the network nodes, namely, the forwarding nodes. Selection of the forwarding nodes is done once data has been transmitted from the source node S generally towards the destination node D, this being unlike the case in static routing protocols where route selection is done before transmission of data from the source node S. This feature extends the advantages of reduced protocol overhead and improved network performance due to reduced energy consumption to an embodiment of the present invention. Apart from the forwarding nodes that are involved in routing data at any given time, all the other network nodes may be deactivated and/or maintained in the sleep mode in an embodiment of the present invention, which feature facilitates further energy savings and improved network performance.

In an embodiment of the present invention, the wireless sensor network 10 is divided into a plurality of disjoint circular areas $A_i$, $i \in \{0, 1, \ldots M-1\}$ that are arranged so as to comprise an inner area $A_0$, one or more outer areas $A_1$, $A_2$ surrounding the inner area $A_0$ and an outermost area $A_{M-1}$ of the outer areas. Each of the areas are separated from each other by boundaries between them. The areas are centred at the destination node D and defined so that a point P of coordinates $(x_p, y_p)$ belongs to an area $A_i$ if a condition, $iR_A \leq \delta(P, D) < (i+1)R_A$ is satisfied, where $R_A$ is a system parameter that specifies the size of an area and $\delta(P, D)$ is the distance between point P and the destination node D. Such a defined condition implies that the source node S lies in the outermost area $A_{M-1}$, whereas the destination node D lies in the inner area $A_0$. Let $N_i$ be a set of network nodes whose geographic location belongs to area $A_i$. In an embodiment of the present invention, $N_i$ is split into three disjoint subsets being $O_i$, $C_i$ and $I_i$ so that $O_i \cup C_i \cup I_i = N_i$. Each node $s_j$ in $N_i$ belongs to one of the subsets according to the following conditions:

$$\begin{cases} s_j \in I_i & \text{if } \delta(s_j, D) - iR_A < R_C \quad \text{inner boundary node for region } \mathcal{A}_i \\ s_j \in O_i & \text{if } (i+1)R_A - \delta(s_j, D) < R_C \quad \text{outer boundary node for region } \mathcal{A}_i \\ s_j \in C_i & \text{if } s_j \notin I_i, s_j \notin O_i \quad \text{centrail region node for region } \mathcal{A}_i. \end{cases}$$

$R_C$ is a system parameter that describes a maximum distance at which two network nodes can communicate reliably with each other and satisfies the constraint $R_A > 2R_C$. As specified by the above conditions, an area in an embodiment of the present invention may be separated into regions, namely, an outer boundary region O, central region C and inner boundary region I comprising corresponding network nodes being outer boundary nodes $O_i$, central region nodes $C_i$ and inner boundary nodes $I_i$. The network nodes in an embodiment of the present invention are configured to autonomously identify a region in a given area to which they belong to and their specific role in that region since they are aware of their own geographic location and the position of the destination node D.

The above-specified conditions do not apply to the outermost area $A_{M-1}$ comprising the source node S and the innermost area $A_0$ comprising the destination node D. So for $A_{M-1}$ comprising the source node S, outer boundary nodes are absent and only inner boundary nodes $I_{M-1}$ and central region nodes $C_{M-1}$ are present. For $A_0$ comprising the destination node D, inner boundary nodes are absent and only central region nodes $C_0$ and outer boundary nodes $O_0$ are present. The outer areas $A_1$, $A_2$ each comprise outer boundary nodes $O_1$, $O_2$, central region nodes $C_1$, $C_2$, and inner boundary nodes $I_1$, $I_2$ in accordance with the above-specified conditions.

In an embodiment of the present invention, a data packet is progressively handed over from the outermost area $A_{M-1}$ to the inner area $A_O$ until the destination node D is reached analogous to a continuous wave flowing from the outermost periphery to the core of the wireless sensor network 10. Data is routed within an area and between the successive regions of an area by geographic routing. With this approach, one specific a priori known subset of the network nodes is in charge of forwarding the data at a given time, which makes it possible for the rest of the network nodes that are not directly involved in routing the data to be maintained in/put into sleep mode, thereby facilitating energy savings.

As mentioned earlier, the network nodes $s_i$ are operated in accordance with a sleep-active schedule comprising a sleep mode and an active mode. In the active mode, the network nodes $s_i$ in an area $A_i$ are periodically assigned an activity period $T_{ac}$ of a predetermined duration, which they may exploit to forward data packets towards the destination node D. Particularly, the activity period $T_{ac}$ is allocated to the set of network nodes $N_i$ whose geographic location belongs to the area $A_i$ so as to receive data traffic from an adjacent area $A_{i+1}$ at a boundary between these areas, to forward the data through the constituent regions of the area $A_i$ up to a boundary with another adjacent area $A_{i-1}$, and to handover the data to a set of network nodes $N_{i-1}$ corresponding to this next adjacent area $A_{i-1}$. Thus, in an embodiment of the present invention, the activity period $T_{ac}$ comprises at least three disjoint phases: an incoming data phase $T_{inc}$ corresponding to when a data packet is received at the outer boundary region of a given area, forwarding data phase $T_{for}$ corresponding to when the data packet traverses through the given area and an outgoing data phase $T_{out}$ corresponding to when the data packet is transmitted from the inner boundary region of the given area to another adjacent-lying area, so that $T_{ac} = T_{inc} + T_{for} + T_{out}$ applies.

As described earlier, the network nodes $N_i$ in an area $A_i$ use the incoming data phase $T_{inc}$ for receiving data packets from an adjacent area $A_{i+1}$. The duration of the incoming data phase $T_{inc}$ is a system parameter and is proportional to the amount of traffic that may be served during one activity period $T_{ac}$. For instance, if an area has to forward a single data packet in one activity period $T_{ac}$, that is, one data packet may be received from the foregoing subset of network nodes in an adjacent-lying area, $T_{inc}$ may be set as the time for a single data transmission. The time taken for a single data transmission may depend on the medium access protocol that is used as well as on the characteristics of the available radio channel. The forwarding data phase $T_{for}$ is used to forward data by way of geographic routing through the different regions of area within the set $N_i$ corresponding to the area $A_i$, from the boundary with $A_{i+1}$ to the boundary with $A_{i-1}$. Thus, the value of $T_{for}$ depends on both the amount of data traffic to be forwarded and on $R_A$, that is, the maximum number of hops that data have to undergo to traverse a given area. Finally, the outgoing data phase $T_{out}$ is used for data handover to nodes $N_{i-1}$ in the next adjacent-lying area $A_{i-1}$. Where the assumption is made that there is only one source node S in an embodiment of the present invention, the amount of data leaving area $A_i$ may not exceed the amount of data that is received during the incoming phase, that is, $T_{out} = T_{inc}$.

Figure 3:
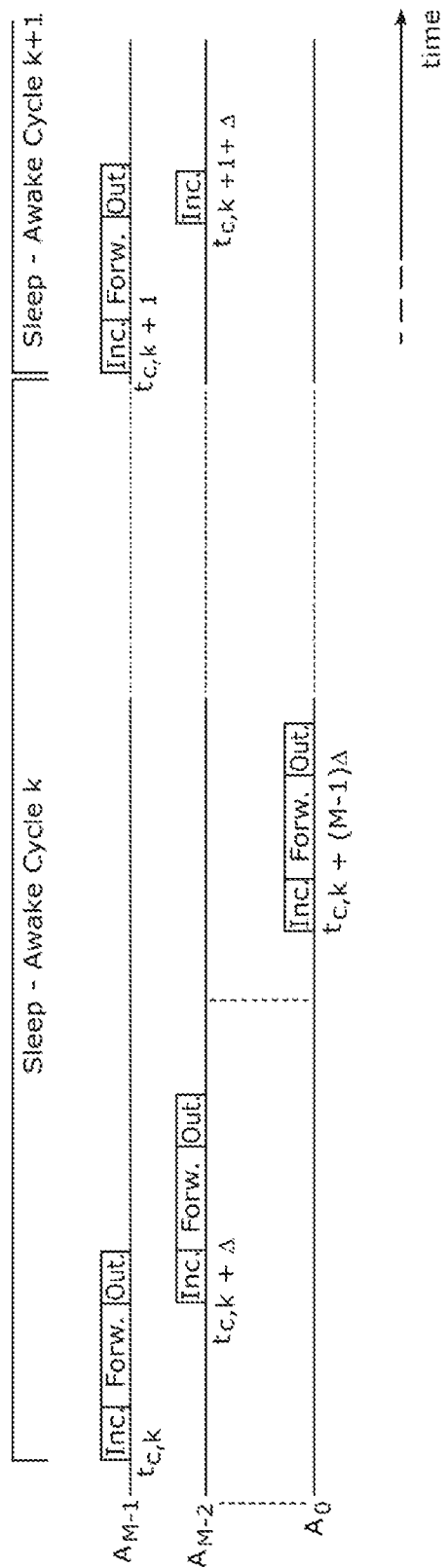
FIG. 3 schematically illustrates the activity cycles for network nodes corresponding to different areas in an embodiment of the present invention.

In order to facilitate the communication of data between a given pair of adjacent areas separated by a boundary, an embodiment of the present invention is configured such that there is an overlap between the activity periods of these areas. In this regard and with reference being made to FIG. 3 wherein the activity cycles for network nodes corresponding to different areas is shown, the incoming data phase $T_{inc}$ for an area $A_i$ overlaps with the outgoing data phase $T_{out}$ for an adjacent-lying area $A_{i+1}$ for data transmission from the inner boundary region of $A_{i+1}$ to the outer boundary region of $A_i$. This may be achieved under the synchronisation hypothesis that is applicable to an embodiment of the present invention. Let $t_{c,k}^{M-1}$ be a time instant known by all the network nodes in the wireless sensor network 10 at which the k-th activity period for an area $A_{M-1}$ starts. To facilitate communication between adjacent areas, an embodiment of the present invention is configured such that the active mode of the set of nodes $N_i$ corresponding to an area $A_i$ starts at a time: $t_{c,k}^i = t_{c,k}^{M-1} + (M-1-i)\Delta$ where $\Delta = T_{inc} + T_{for}$. When data is communicated between a given pair of adjacent areas in a given time window, all the network nodes corresponding to the different regions in the respective areas need not be operated in the active mode. Thus, and with reference to the previous example when considered in conjunction with FIG. 3, only the inner boundary nodes $I_{i+1}$ of area $A_{i+1}$ are activated during the outgoing phase $T_{out}$ of this area and only the outer boundary nodes $O_i$ of area $A_i$ are activated during the incoming phase $T_{inc}$ during data transfer between these areas.

Figure 4:
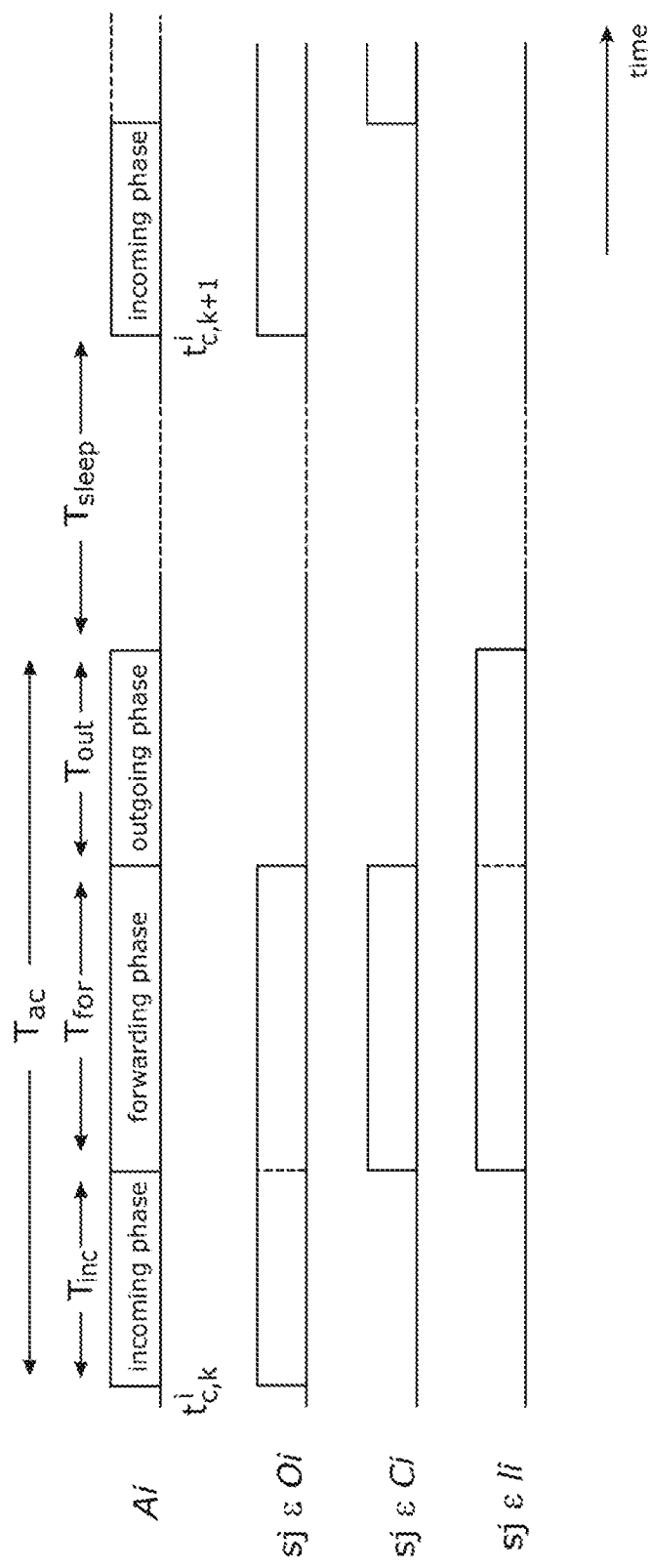
FIG. 4 schematically illustrates the activity cycles for network nodes corresponding to the same area in an embodiment of the present invention.

As can be seen from FIG. 4, which schematically illustrates the activity of network nodes within a given area in an embodiment of the present invention, all the elements in a set of nodes $N_i$, corresponding to the different regions in a given area $A_i$, need to be activated during the whole of the activity period $T_{ac}$. For example, only the outer boundary nodes $O_i$ play a role in the incoming data phase $T_{inc}$ of area $A_i$, because it is likely that they are the only nodes out of the set of nodes $N_i$ that are within the radio communication of the nodes in an adjacent-lying area $A_{i+1}$ from which data is received. Likewise, only the inner boundary nodes $I_i$ play a role in the outgoing data phase $T_{out}$ of area $A_i$. On the other hand, all of the nodes in set $N_i$ are activated in the forwarding phase $T_{for}$ so that data is communicated across the area $A_i$ for handover to another adjacent-lying area. Starting from these remarks, and letting $t_{c,k}^i$ be the starting time for an activity period $T_{ac}$ of region $A_i$, the nodes in $N_i$ are activated according to the following policy:

$s_j \in O_i$ active in $[t_{c,k}^i, t_{c,k}^i + T_{inc} + T_{for}]$
$s_j \in C_i$ active in $[t_{c,k}^i + T_{inc}, t_{c,k}^i + T_{inc} + T_{for}]$
$s_j \in I_i$ active in $[t_{c,k}^i + T_{inc}, t_{c,k}^i + T_{ac}]$.

As previously discussed, each of the network nodes is activated for only a fraction of the activity period $T_{ac}$, this being when it is involved in routing data. For the time of the activity period $T_{ac}$ when the network nodes are not involved in data routing, the network nodes in an embodiment of the present invention may be deactivated. The sleep period $T_{sleep}$ is a time period separating two consecutive activity periods. The sum of the activity period $T_{ac}$ and sleep period $T_{sleep}$ is constant for all the areas and is a system parameter that determines the duration of the sleep-active schedule for the wireless sensor network 10 as can be clearly seen from FIGS. 3 and 4.

Figure 5:
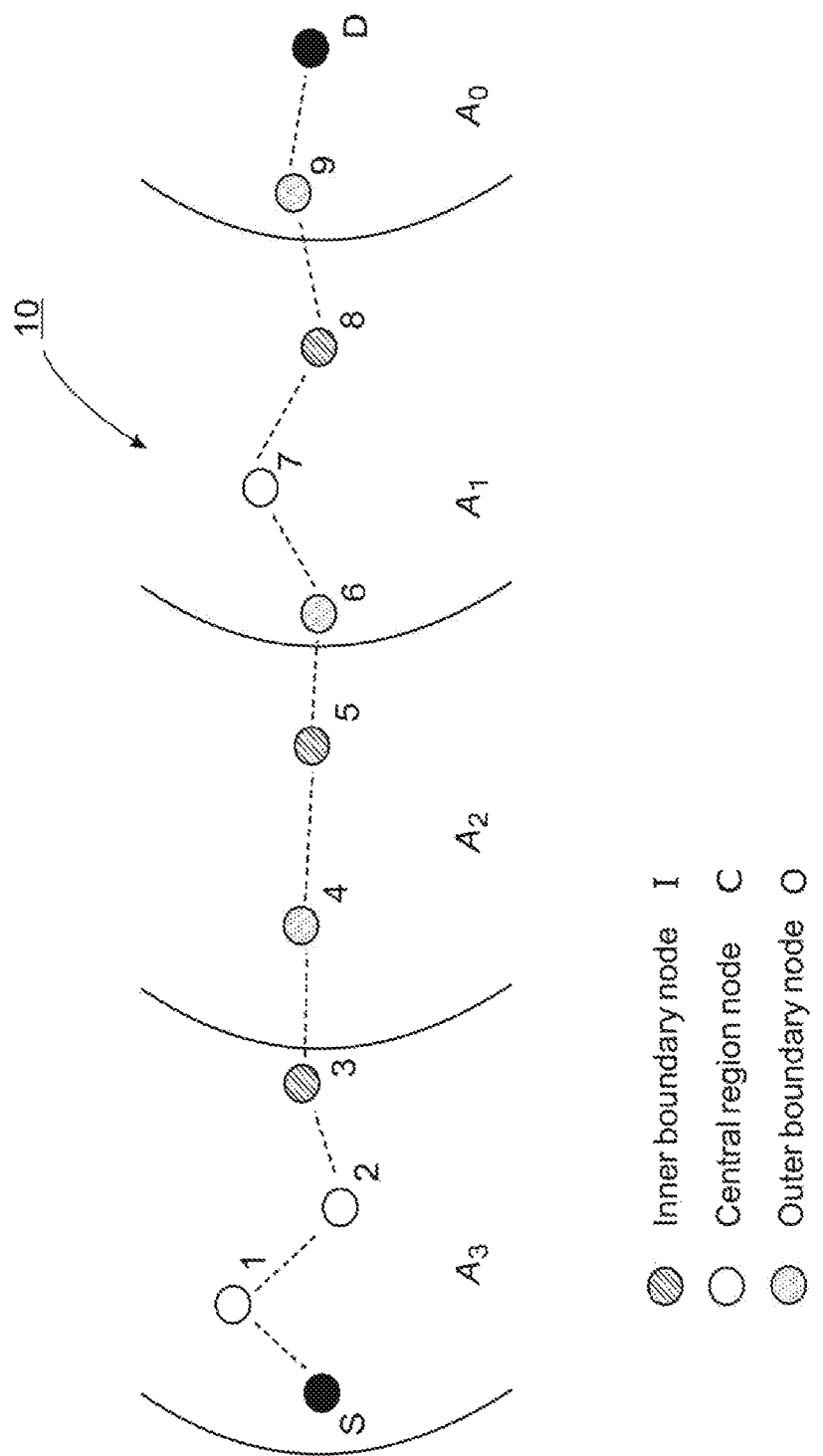
FIG. 5 schematically illustrates a topology according to an embodiment of the present invention.

Reference is now made to FIG. 5 in order to gain an understanding of an embodiment of the present invention when in operation. In this example, the wireless sensor network 10 is divided into four areas, $A_0$, $A_1$, $A_2$, $A_3$, separated from each other by boundaries and comprising corresponding sets of nodes $N_0 = \{D, s_9\}$, $N_1 = \{s_8, s_7, s_6\}$, $N_2 = \{s_5, s_4\}$ and $N_3 = \{s_3, s_2, s_1, S\}$. Assuming that only adjacent nodes, which are depicted as connected by a dashed line in FIG. 5, may communicate with each other by virtue of, for example, being within radio communication range of each other. In terms of node allocation, and as shown in FIG. 5 for ease of understanding, $s_9$, $s_6$ and $s_4$ are outer boundary nodes O, $s_7$, $s_2$ and $s_1$ are central region nodes C and $s_8$, $s_5$ and $s_3$ are inner boundary nodes I. Supposing that a single data packet is to be routed from the source node S to the destination node D during an activity period $T_{ac}$ and at most three hops are needed to traverse an area in the topology shown in FIG. 5, the respective durations of the incoming data phase $T_{inc}$, forwarding data phase $T_{for}$ and outgoing data phase $T_{out}$ are set as: $T_{inc} = T_{out} = T_{tx}$, $T_{for} = 3 \cdot T_{tx}$, where $T_{tx}$ accounts for a time taken to route the data packet through a single hop.

Figure 6:
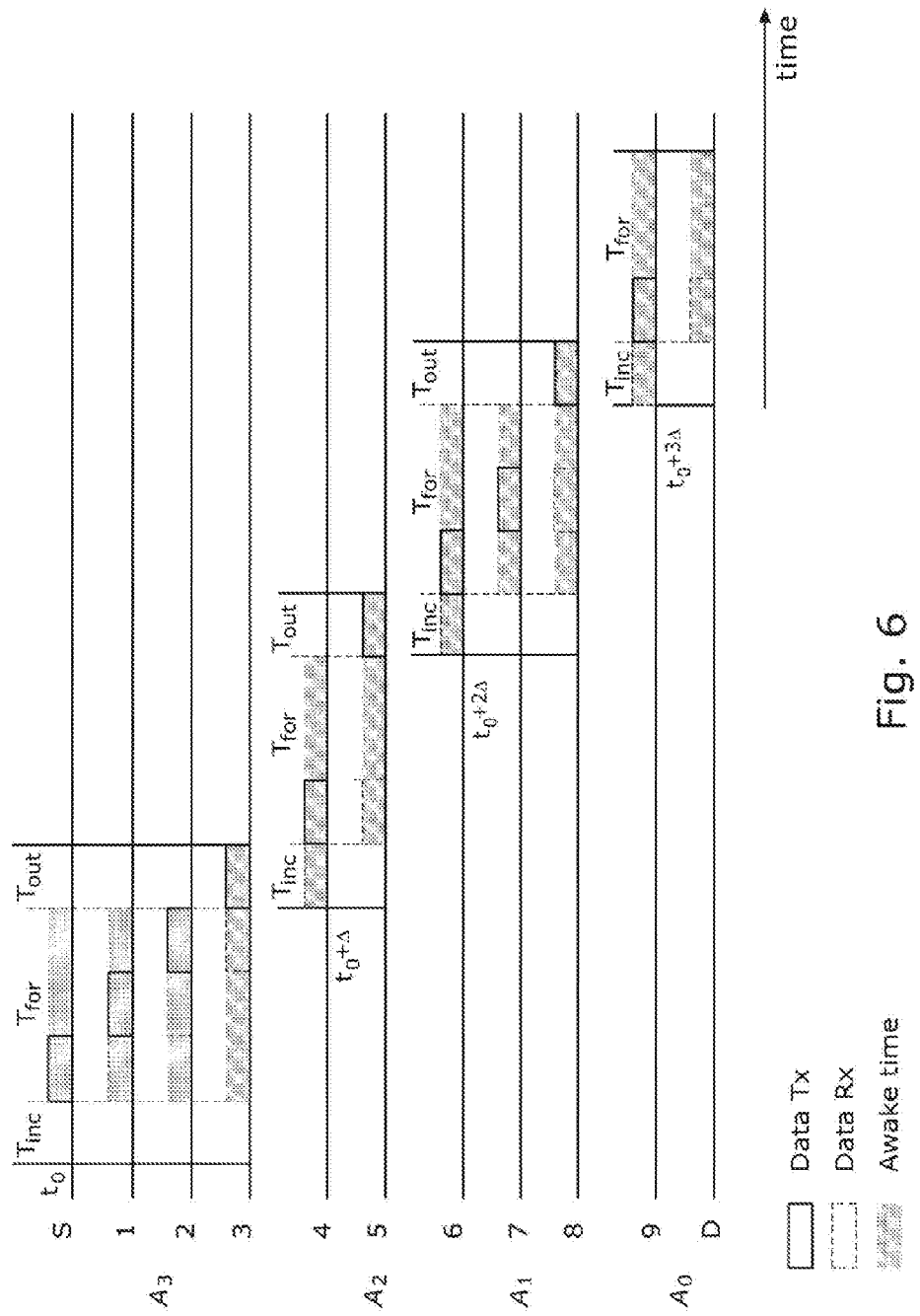
FIG. 6 schematically illustrates a time diagram corresponding to the topology shown in FIG. 5.

Turning to FIG. 6, which shows a time diagram corresponding to the topology shown in FIG. 5, $t_0$ is taken to be the starting time for the k-th activity period for area $A_3$, that is, $t_0 = t_{c,k}^3$. During the interval $[t_0, t_0 + T_{inc}]$, all the nodes in the set $N_3$ are operated in sleep mode since area $A_3$ has no incoming data traffic to receive. When the source S has a data packet to transmit, it initiates a geographic routing procedure by broadcasting a request message. In the topology of FIG. 5, network node $s_1$ is likely to be within the radio communication range of the source node S out of all the other network nodes in set $N_3$ and so it responds to the request message, is selected as the next hop/forwarding node and subsequently receives the data packet from the source node S. These steps are then reiterated by network nodes $s_1$ and $s_2$ until the data is forwarded to network node $s_3$. In order to forward the data packet from the source node S, by multi-hop transmission, across area $A_3$, all the network nodes in the set to $N_3$, i.e. $s_3$, $s_2$, $s_1$, S, are activated as of a time $t_0 + T_{inc}$ so that they may be involved in such data forwarding, which is scheduled to occur during the forwarding data phase $T_{for}$ of the activity period $T_{ac}$. At a time $t_0 + T_{inc} + T_{for}$, and with respect to the set of network nodes $N_3$, the nodes in $C_3 = \{s_2, s_1, S\}$, are deactivated and only the inner boundary node $I_3 = \{s_3\}$ is maintained in the activated state, thereby to facilitate handover of the data packet to the next generation of forwarding nodes in adjacent-lying area $A_2$.

Regarding data routing in area $A_2$, and as depicted in FIG. 6, the activity period $T_{ac}$ of this area starts at a time $t_0 = t_{c,k}^2 = t_0 + \Delta = t_0 + T_{inc} + T_{for}$. As can be clearly seen from FIG. 6, in an embodiment of the present invention, the outgoing data phase $T_{out}$ of the activity period $T_{ac}$ assigned to area $A_3$ overlaps with the incoming data phase of the activity period $T_{ac}$ of area $A_2$ so that the data packet may be handed over from $A_3$ to $A_2$ at the boundary between them, this being done in the time interval $[t_{c,k}^2, t_{c,k}^2 + T_{inc}]$ by geographic routing as hereinbefore described. At a time $t_{c,k}^2 + T_{inc}$, when the data packet has been routed to area $A_2$, the activity period $T_{ac}$ assigned to area $A_3$ is completed and so the inner boundary node $I_3=\{s_3\}$ thereof is deactivated. As can be seen from FIG. 6, during the incoming data phase $T_{inc}$ of the activity period assigned to area $A_2$, only the outer boundary node $O_2=\{s_4\}$ is activated. During the forwarding phase $T_{for}$ of the activity period $T_{ac}$ of area $A_2$, all of the network nodes of the set $N_2$ are activated, i.e. $O_2=\{s_4\}$ and $C_2 \cup I_2=\{s_5\}$ during which phase the data packet is forwarded from $s_4$ to $s_5$. For the given topology under consideration, the data packet traverses the area $A_2$ in a single-hop and so $s_5$ receives the data packet addressed to the destination node D before the end of the forwarding phase $T_{for}$ allocated to area $A_2$. However, at this time, the activity period $T_{ac}$ assigned to area $A_1$ has not been initiated and so the outer boundary nodes thereof, i.e. $O_1=\{s_6\}$ is not available for communication and any attempt at forwarding the data packet to area $A_1$ would fail. Thus, and as shown in FIG. 6, $s_5$ defers any activity until a time $t_{c,k}^2+T_{inc}+T_{for}=t_{c,k}^3+2\Delta=t_{c,k}^1$, which is when the activity period of $T_{ac}$ of area $A_1$ begins and outer boundary nodes $O_1=\{s_6\}$ are activated to partake in the incoming data phase $T_{inc}$ of area $A_1$. As can be seen from FIG. 6, the outgoing data phase $T_{out}$ of area $A_2$ and the incoming data phase $T_{inc}$ of area $A_1$ are configured to overlap in an embodiment of the present invention so that data may be handed over from the inner boundary node $I_2=\{s_5\}$ of area $A_2$ to the outer boundary node $O_1=\{s_6\}$ of area $A_1$. When the outgoing data phase $T_{out}$ of area $A_2$ begins, the forwarding phase $T_{for}$ allocated to this area ends, in which case the outer boundary node $O_2=\{s_4\}$ of area $A_2$ is deactivated.

Regarding data routing in area $A_2$ and as depicted in FIG. 6, during $[t_{c,k}^1, t_{c,k}^1+T_{inc}]$, which is the outgoing data phase $T_{out}$ of area $A_2$ and the incoming data phase $T_{inc}$ of area $A_1$, the data packet is handed over from the inner boundary node $I_2=\{s_5\}$ of area $A_2$ to the outer boundary node $O_1=\{s_6\}$ of area $A_1$. Then, at a time $t_{c,k}^1+T_{inc}=t_{c,k}^2+T_{ac}$, the outgoing data phase $T_{out}$ of area $A_2$ and the activity period thereof generally comes to an end. Thus, the inner boundary node $I_2=\{s_5\}$ of area $A_2$ is deactivated and $C_1 \cup I_1=\{s_7, s_8\}$ are also activated to partake in the forwarding data phase $T_{for}$ of the activity period $T_{ac}$ allocated to area $A_1$. The data packet is routed across area $A_1$ following the shortest geographic path $s_6$-$s_7$-$s_8$. For the topology under consideration, the data packet reaches the boundary between areas $A_1$ and $A_0$ before the end of the forwarding phase $T_{for}$ allocated to area $A_1$. Thus, the inner boundary node $I_1=\{s_8\}$ of area $A_1$ defers further activity/data transmission until the start of the activity period of area $A_0$. At a time $t_{c,k}^1+T_{inc}+T_{for}=t_0+3\Delta=t_{c,k}^0$, $C_1 \cup I_1=\{s_6, s_7\}$ are deactivated and $O_0=\{s_9\}$ of area $A_0$ is activated during the incoming data phase $T_{inc}$ of area $A_0$ which overlaps with the outgoing data phase $T_{out}$ of area $A_1$. During the time interval $t_{c,k}^0$, $t_{c,k}^0+T_{inc}$, the inner boundary node $I_1=\{s_8\}$ of area $A_1$ forwards the data packet to the outer boundary node $O_0=\{s_9\}$ of area $A_0$ after which $s_8$ is deactivated. At a time $t_{c,k}^0+T_{inc}$, the destination node D is activated, since it belongs to $C_0$ and the data packet may be delivered to it by $s_9$, thereby completing the routing procedure through the wireless network 10.

Figure 7:
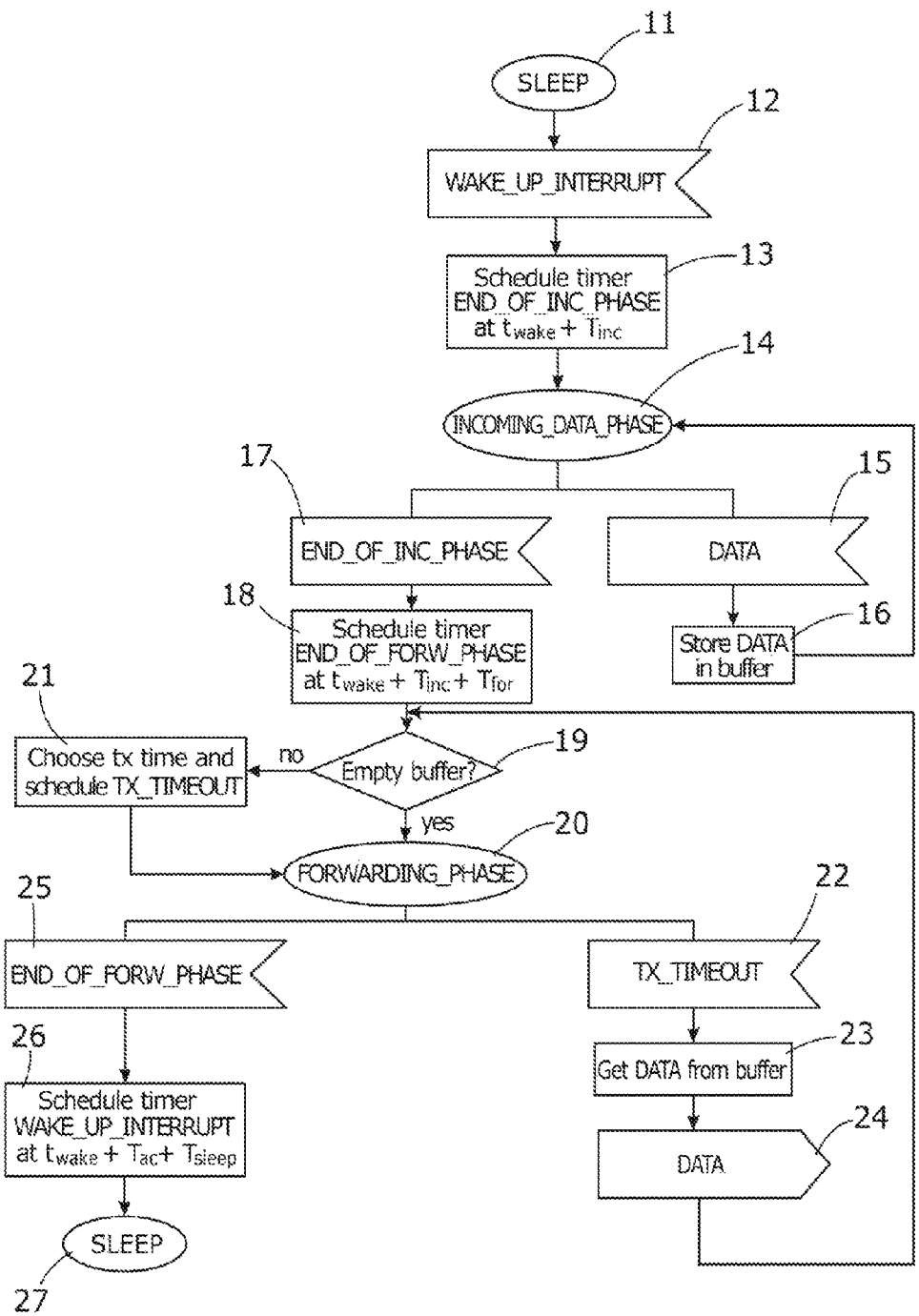
FIG. 7 illustrates a state transition diagram for the behaviour of an outer boundary node in an embodiment of the present invention.

Reference is now made to FIG. 7, which schematically illustrates the behaviour of an outer boundary node of an area $A_i$, i.e. a node in $O_i$, during the k-th sleep-active cycle. At a time $t_{wake}=t_{c,k}^i$, the node leaves a sleep state 11, after the expiry of a previously-scheduled WAKE_UP_INTERRUPT signal 12. Then, the node schedules an END_OF_INC_PHASE timer at a time $t_{wake}+T_{inc}$ 13, which triggers appropriate actions at the end of an incoming data phase for the area $A_i$. The node then enters the INCOMING_DATA_PHASE state 14 during which the node is configured to continuously listen to the radio channel established between the network nodes in an embodiment of the present invention. If a DATA packet is received 15 from an inner boundary node of an adjacent-lying area $A_{i+1}$, it is stored in a buffer for later processing 16. When the END_OF_INC_PHASE timer expires 17, the node leaves the INCOMING_DATA_PHASE state and schedules a new timer END_OF_FORW_PHASE at a time $t_{wake}+T_{inc}+T_{for}$ 18 that will signal the end of the forwarding data phase for the area $A_i$. If the node has no previously-stored DATA packets in its buffer 19, it enters the FORWARDING_PHASE state 20. If the node has previously-stored DATA packets in its buffer, it chooses a random back-off interval, schedules a TX_TIMEOUT timer at the end of such an interval 21 and enters the FORWARDING_PHASE state 20. If, while in the FORWARDING_PHASE state 20, expiry of a TX_TIMEOUT timer occurs 22, then the node gets a DATA packet from its buffer 23 and initiates a geographic routing procedure such as hereinbefore described, to transmit the DATA packet 24. Once this is done, the node checks if there are any other DATA packets in the buffer. If so, the node chooses a random back-off, schedules a TX_TIMEOUT timer at the end of such an interval 21 and enters the FORWARDING_PHASE state 20. Otherwise, the node simply enters the FORWARDING_PHASE state 20. When the END_OF_FORW_PHASE timer expires 25, the node schedules a WAKE_UP_INTERRUPT timer at a time $t_{wake}+T_{ac}+T_{sleep}$ 26 and enters the sleep state 27.

Figure 8:
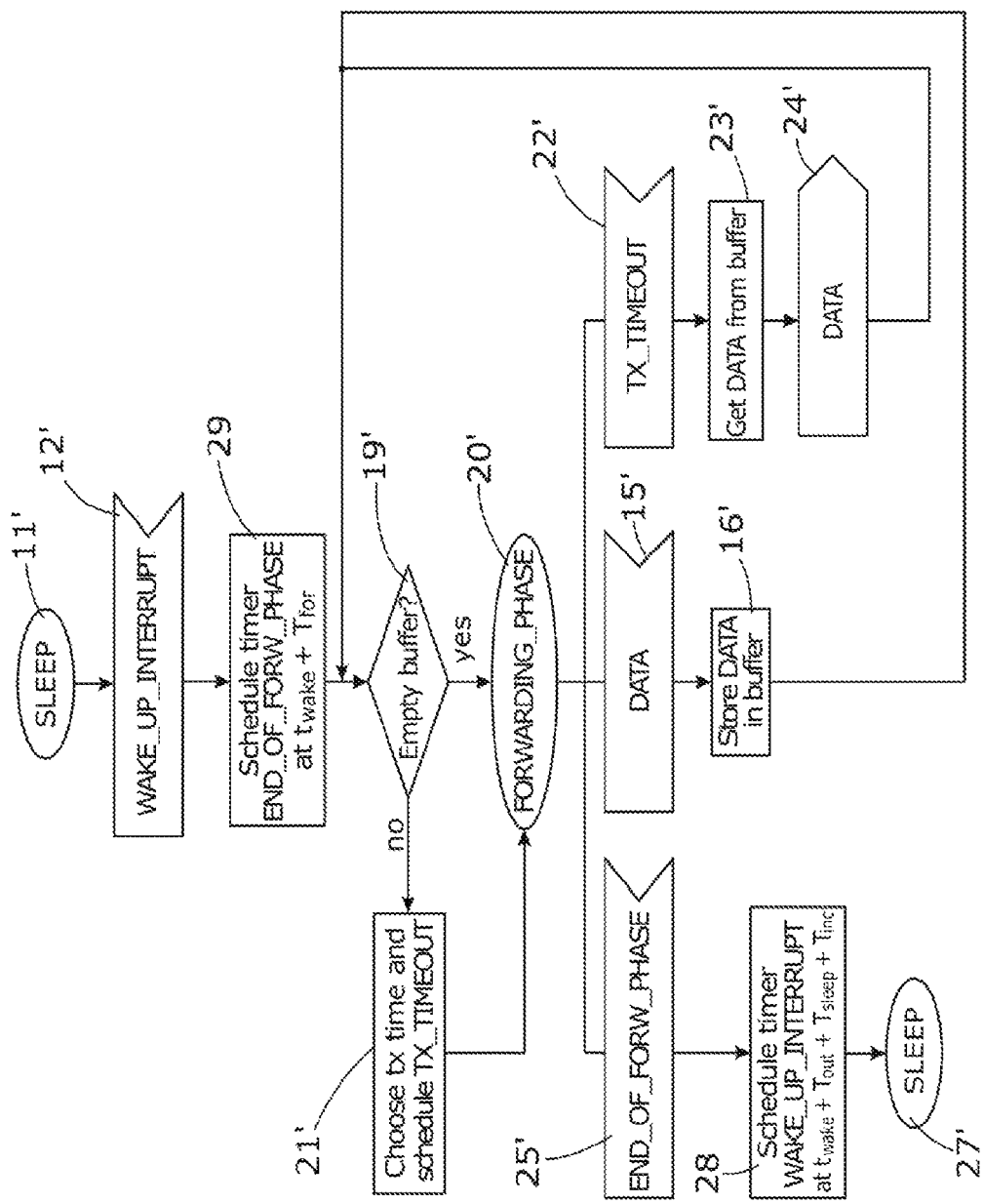
FIG. 8 illustrates a state transition diagram for the behaviour of a central region node in an embodiment of the present invention.

Reference is now made to FIG. 8, which schematically illustrates the behaviour of a central region node of an area $A_i$, i.e. a node in $C_i$, during the k-th sleep-active cycle. At a time $t_{wake}=t_{c,k}^i+T_{inc}$, the node leaves a sleep state 11', after the expiry of a previously-scheduled WAKE_UP_INTERRUPT 12'. Then, the node schedules an END_OF_FORW_PHASE timer at a time $t_{wake}+T_{for}$ 29, which will signal the end of the forwarding data phase for the area $A_i$ and checks its buffer. If the node has no previously-stored DATA packets in its buffer 19', it enters the FORWARDING_PHASE state 20' and starts listening to the radio channel established between the network nodes in an embodiment of the present invention. If the node has previously-stored DATA packets in its buffer 19', it chooses a random back-off interval, schedules a TX_TIMEOUT timer at the end of such an interval 21', enters the FORWARDING_PHASE state 20' and starts listening to the radio channel. If, while in the FORWARDING_PHASE state 20', a DATA packet 15' routed by geographic routing is received from a node either in $O_i$ or in $C_i$, the node stores it in its buffer 16', chooses a random back-off interval, schedules a TX_TIMEOUT timer at the end of such an interval 21' and goes back to the FORWARDING_PHASE state 20'. If, on the other hand, a expiry of a TX_TIMEOUT timer occurs 22', then the node gets a DATA packet from its buffer 23' and initiates a geographic routing procedure such as hereinbefore described, to transmit the DATA packet 24'. Once this is done, the node checks if there are any other DATA packets in the buffer 19'. If so, the node chooses a random back-off, schedules a TX_TIMEOUT timer at the end of such an interval 21' and enters the FORWARDING_PHASE state 20'. Otherwise, the node simply enters the FORWARDING_PHASE state 20'. When the END_OF_FORW_PHASE timer expires 25', the node schedules a WAKE_UP_INTERRUPT timer at a time $t_{wake}+T_{out}+T_{sleep}+T_{inc}$ 28 and enters the sleep state 27'.

Figure 9:
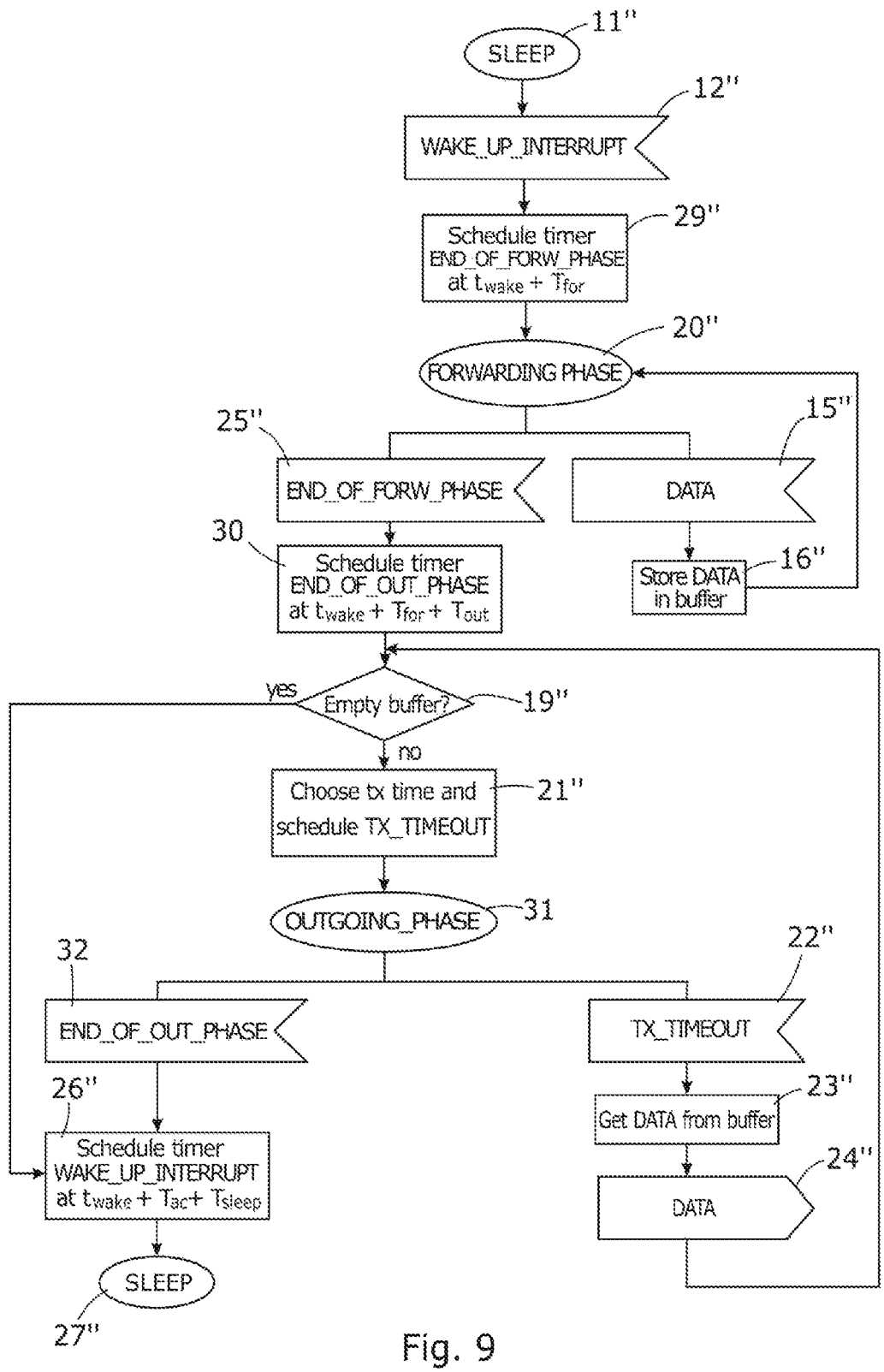
FIG. 9 illustrates a state transition diagram for the behaviour of an inner boundary node in an embodiment of the present invention.

Reference is now made to FIG. 9, which schematically illustrates the behaviour of a inner boundary node of an area $A_i$, i.e. a node in $I_i$, during the k-th sleep-active cycle. At a time $t_{wake}=t_{c,k}^i+T_{inc}$, the node leaves a sleep state 11", after the expiry of a previously-scheduled WAKE_UP_INTERRUPT signal 12". Then, the node schedules an END_OF_FORW_PHASE timer at a time $t_{wake}+T_{for}$ 29", which signals the end of the forwarding data phase for the area $A_i$, enters the FORWARDING_PHASE state 20" and starts listening to the radio channel established between the network nodes in an embodiment of the present invention. If a DATA packet 15" routed by geographic routing is received from a node $C_i$, the node stores it in its buffer 16" and goes back to the FORWARDING_PHASE state 20". When the END_OF_FORW_PHASE timer expires 25", the node leaves the FORWARDING_PHASE state, schedules an END_OF_OUT_PHASE timer at a time $t_{wake} T_{for} T_{out}$ 30, and checks if it has DATA packets in its buffer. If the buffer is empty, it schedules a WAKE_UP_INTERRUPT timer at a time $t_{wake} T_{sleep} T_{ac}$ 26" and enters the sleep state 27". Otherwise, the node chooses a random back-off interval, schedules a TX_TIMEOUT timer at the end of such an interval 21" and enters the OUTGOING_PHASE state 31. If, on the other hand, a expiry of a TX_TIMEOUT timer occurs 22" while in the OUTGOING_PHASE state, then the node gets a DATA packet from its buffer 23" and initiates a geographic routing procedure such as hereinbefore described, to transmit the DATA packet 24". Once this is done, the node checks if there are any other DATA packets in the buffer 19". If so, the node chooses a random back-off, schedules a TX_TIMEOUT timer at the end of such an interval 21" and goes back to the OUTGOING_PHASE state 31. Otherwise, it schedules a WAKE_UP_INTERRUPT timer at a time $T_{wake}+T_{sleep}+T_{ac}$ 26" and enters the sleep state 27". Finally, if the END_OF_OUT_PHASE timer expires 32 while the node is still in the OUTGOING_PHASE state 31, the node leaves it, schedules a WAKE_UP_INTERRUPT timer at a $T_{wake}+T_{sleep}+T_{ac}$ 26" and enters the sleep state 27".

An embodiment of the present invention is not limited to a wireless sensor network and, indeed, may be applicable to any suitable ad hoc wireless network such as, for example, a mobile communication network in which the network nodes would be represented by mobile telephones in that network.

The present invention has been described above purely by way of example and modifications of detail may be made within the scope of the invention.

Each feature disclosed in the description, and where appropriate, the claims and the drawings may be provided independently or in any appropriate combination.

The invention claimed is:

1. A method for routing a data packet in a wireless sensor network, the method comprising the steps of:
    operating network nodes according to a sleep-active schedule, wherein the sleep-active schedule comprises a sleep mode and an active mode;
    configuring the network nodes to include information on geographic locations of the network nodes and the geographic location of a destination node;
    dividing the wireless sensor network into a plurality of disjoint areas that are separated by boundaries;
    separating each area into at least two regions, wherein the at least two regions include an inner boundary region, a central region, and an outer boundary region;
    selecting forwarding nodes from the network nodes to route the data packet from a source node to the destination node, wherein the forwarding nodes are selected based on the geographic location of the forwarding nodes relative to the destination node, and wherein the network nodes are synchronised relative to each other; and
    configuring the sleep-active schedule so that only the forwarding nodes that are selected to route the data packet in a time window are operable in the active mode and all other network nodes are operable in the sleep mode.

2. The method as claimed in claim 1, further comprising configuring the sleep-active schedule so that a pair of adjacent areas are separated by a boundary so that an outer boundary region of one area of the pair of adjacent areas and the inner boundary region of the other area of the pair of adjacent areas abut the boundary that separates the pair of adjacent areas to create an overlap between the active modes of the forwarding nodes in the outer boundary region of the one area of the pair of adjacent areas and the inner boundary region of the other area of the pair of adjacent areas.

3. The method as claimed in claim 1, further comprising configuring the sleep-active schedule so that there is an overlap between the active modes of the forwarding nodes corresponding to the regions in a respective area.

4. The method as claimed in claim 1, wherein the active mode configured to comprises:
    an incoming data phase corresponding to when the data packet is received at the outer boundary region of an area;
    forwarding data phase corresponding to when the data packet traverses through the area; and
    an outgoing data phase corresponding to when the data packet is transmitted from the inner boundary region of the area to another adjacent-lying area.

5. The method as claimed in claim 4, further comprising configuring the sleep-active schedule so that there is overlap between the outgoing data phase of the forwarding nodes in the inner boundary region of one area of the pair of adjacent areas and the incoming data phase of the forwarding nodes in the outer boundary region of the other area of the pair of adjacent areas.

6. The method as claimed in claim 4, wherein if the data packet is received before the end of a forwarding phase in one area of a pair of adjacent areas and an active period of the other area of the pair of adjacent areas has not commenced, the forwarding of the data packet from the one area to the other area of the adjacent pair of areas is deferred until an active period commences.

7. The method as claimed in claim 4, further comprising configuring the sleep-active schedule so that there is an overlap between the forwarding phases of the forwarding nodes in the regions of an area.

8. The method as claimed in claim 1, further comprising arranging the areas to include: an inner area comprising the destination node, one or more outer areas surrounding the inner area, and the outermost area of the outer areas which includes the source node.

9. The method as claimed in claim 8, wherein the outermost area which includes the source node, is separated to include at least a central region and an inner boundary region.

10. The method as claimed in claim 8, wherein the inner area includes the destination node which is separated to include at least an outer boundary region and a central region.

11. The method as claimed in claim 8, further comprising separating an outer area to include an inner boundary region, central region, and an outer boundary region.

12. The method as claimed in claim 1, further comprising separating each area so that the network nodes corresponding to the outer boundary region, central region, and the inner boundary region, are allocated to be outer boundary nodes, central region nodes, and inner boundary nodes respectively.

13. The method as claimed claim 1, wherein a global positioning system configures the network nodes to include information of the geographic location of the network nodes.

14. A wireless sensor network comprising:
- a source node for transmitting a data packet;
- a destination node for receiving the data packet transmitted by the source node;
- network nodes for configuring to a sleep-active schedule, wherein the sleep-active schedule comprises at least a sleep mode and an active mode and the network nodes are configured to include information on a geographic location of the network nodes and a geographic location of the destination node;
- a plurality of disjoint areas that are separated by boundaries, wherein at least two regions in an area include an inner boundary region, a central region and an outer boundary region; and
- forwarding nodes comprising a subset of the network nodes, wherein the subset of network nodes are selected based on the geographic location of the network nodes relative to the destination node;
- wherein the network nodes are synchronised relative to each other to route the data packet from the source node to the destination node; and
- wherein only those forwarding nodes that are selected to route the data packet in a time window are operable in the active mode and the other network nodes are operable in the sleep mode.

15. The wireless sensor network as claimed in claim 14, wherein a pair of adjacent areas are separated by a boundary, so that the outer boundary region of one area out of the pair of areas and the inner boundary region of the other area of the pair of areas abut the boundary that separates the pair of adjacent areas so that at least the forwarding nodes in the outer boundary region of the one area out of the pair of adjacent areas and the inner boundary region of the other area out of the pair of adjacent areas are operable such that there is an overlap between the respective active modes.

16. The wireless sensor network as claimed in claim 14, wherein the forwarding nodes correspond to the regions in an area so that there is an overlap between their respective active modes.

17. The wireless sensor network as claimed in claim 14, wherein the active mode in the sleep-active schedule comprises:
- an incoming data phase corresponding to when the data packet is received at an outer boundary region of an area;
- forwarding data phase corresponding to when the data packet traverses through the area; and
- an outgoing data phase corresponding to when the data packet is transmitted from the inner boundary region of the area to another adjacent-lying area.

18. The wireless sensor network as claimed in claim 17, wherein the forwarding nodes in a pair of adjacent areas are separated so that there is an overlap between the outgoing data phase of the forwarding nodes in the inner boundary region of one area of the pair of adjacent areas and the incoming data phase of the forwarding nodes in the outer boundary region of the other area of the pair of adjacent areas.

19. The wireless sensor network as claimed in claim 17, wherein the forwarding nodes in a pair of adjacent areas are separated by a boundary so that, if the data packet is received before the end of a forwarding phase in one area of a pair of adjacent areas and the active period of the other area of the given pair of adjacent areas has not commenced, forwarding the data packet from the one area to the other area of the pair of adjacent areas is deferred until such an active period commences.

20. A non-transitory computer readable storage medium tangible embodying a computer readable program code having computer readable instructions which, when implemented, cause a computer device to carry out the steps of a method for routing a data packet in a wireless sensor network comprising:
- operating network nodes according to a sleep-active schedule, wherein the sleep-active schedule comprises a sleep mode and an active mode;
- configuring the network nodes to include information on geographic locations of the network nodes and the geographic location of a destination node;
- dividing the wireless sensor network into a plurality of disjoint areas that are separated by boundaries;
- separating each area into at least two regions, wherein the at least two regions include an inner boundary region, a central region, and an outer boundary region;
- selecting forwarding nodes from the network nodes to route the data packet from a source node to the destination node, wherein the forwarding nodes are selected based on the geographic location of the forwarding nodes relative to the destination node, and wherein the network nodes are synchronised relative to each other; and
- configuring the sleep-active schedule so that only the forwarding nodes that are selected to route the data packet in a time window are operable in the active mode and all other network nodes are operable in the sleep mode.

* * * * *